(12) United States Patent
Cloud et al.

(10) Patent No.: US 12,276,848 B2
(45) Date of Patent: Apr. 15, 2025

(54) MULTI-PORT UNIBOOT CONNECTOR FOR MULTI-FIBER PLUG HOUSINGS

(71) Applicant: US Conec, Ltd, Hickory, NC (US)

(72) Inventors: Mitchell Cloud, Hickory, NC (US); Jason Higley, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 141 days.

(21) Appl. No.: 17/780,717

(22) PCT Filed: Dec. 18, 2020

(86) PCT No.: PCT/US2020/066160
§ 371 (c)(1),
(2) Date: May 27, 2022

(87) PCT Pub. No.: WO2021/127531
PCT Pub. Date: Jun. 24, 2021

(65) Prior Publication Data
US 2023/0012292 A1    Jan. 12, 2023

Related U.S. Application Data

(60) Provisional application No. 62/949,718, filed on Dec. 18, 2019.

(51) Int. Cl.
*G02B 6/38* (2006.01)
(52) U.S. Cl.
CPC ....... *G02B 6/38875* (2021.05); *G02B 6/3825* (2013.01); *G02B 6/3831* (2013.01)

(58) Field of Classification Search
CPC .......................... G02B 6/38875; G02B 6/3831
See application file for complete search history.

(56) References Cited

U.S. PATENT DOCUMENTS

| | | |
|---|---|---|
| 5,315,679 A | 5/1994 | Baldwin et al. |
| 5,689,598 A | 11/1997 | Dean, Jr. et al. |
| 6,572,276 B1 | 6/2003 | Theis et al. |
| RE43,221 E | 3/2012 | James et al. |
| 8,403,570 B2 | 3/2013 | Fisher et al. |

(Continued)

FOREIGN PATENT DOCUMENTS

| | | |
|---|---|---|
| EP | 1172673 A2 | 1/2002 |
| WO | 2020180806 A1 | 9/2020 |

OTHER PUBLICATIONS

HellermanTyton, RapidNet Fiber LC Cassette to LC Cassette, Aug. 3, 2017.

(Continued)

*Primary Examiner* — Sung H Pak
(74) *Attorney, Agent, or Firm* — Michael L. Leetzow PLLC; Shubhrangshu Sengupta

(57) ABSTRACT

A cover for a fiber optic ferrule and ferrule push includes a sleeve extending lengthwise between opposed front and rear ends and defines a lengthwise-extending opening that opens through the rear end for receiving at least a portion of the fiber optic fiber optic ferrule and the ferrule push. The sleeve also includes a top side and an opposing bottom side, and two side walls extending between the top side and the bottom side and along at least a portion of the sleeve. A receiver is disposed in the top side to receive a projection associated with the ferrule push.

12 Claims, 14 Drawing Sheets

(56) References Cited

U.S. PATENT DOCUMENTS

| | | | |
|---|---|---|---|
| 9,104,007 B2 | 8/2015 | James et al. | |
| 9,395,509 B2 | 7/2016 | Petersen et al. | |
| 9,417,420 B2 | 8/2016 | Fisher et al. | |
| 10,146,015 B2 | 12/2018 | Zimmel et al. | |
| 10,281,668 B2 | 5/2019 | Takano et al. | |
| 10,591,681 B2 | 3/2020 | Smith et al. | |
| 10,656,360 B2 | 5/2020 | Sedor et al. | |
| 10,677,996 B2 | 6/2020 | Aoshima et al. | |
| 10,788,626 B1 | 9/2020 | Leigh et al. | |
| 11,016,250 B2 | 5/2021 | Higley et al. | |
| 11,079,555 B2 | 8/2021 | Chang et al. | |
| 11,131,820 B2 | 9/2021 | Sedor et al. | |
| 2004/0062487 A1 | 4/2004 | Mickievicz | |
| 2017/0371109 A1* | 12/2017 | Gniadek | G02B 6/3893 |
| 2018/0052287 A1 | 2/2018 | Smith et al. | |
| 2018/0252872 A1 | 9/2018 | Chen | |
| 2019/0154924 A1 | 5/2019 | Chang et al. | |
| 2019/0278028 A1 | 9/2019 | Higley | |
| 2019/0377139 A1 | 12/2019 | Chang et al. | |
| 2020/0124816 A1 | 4/2020 | Berridge | |
| 2020/0271883 A1 | 8/2020 | Sedor et al. | |
| 2020/0278503 A1 | 9/2020 | Chang et al. | |
| 2020/0301077 A1 | 9/2020 | Leigh et al. | |
| 2020/0408998 A1 | 12/2020 | Iizumi et al. | |

OTHER PUBLICATIONS

ISR/WO from PCT/US2020/066160, mailed Mar. 23, 2021.
Translation of Office Action in Related Chinese Application; Dec. 15, 2023; 6 pages.

* cited by examiner

MULTI-PORT UNIBOOT CONNECTOR FOR MULTI-FIBER PLUG HOUSINGS

REFERENCE TO RELATED CASE

This application claims priority under 35 U.S.C. § 119 (e) to U.S. provisional application No. 62/949,718 filed on Dec. 18, 2019, the contents of which are hereby incorporated by reference in their entirety.

BACKGROUND OF THE INVENTION

Duplex connector plug housings are used in small form factor adapter footprints, e.g., the SFP/QSFP footprint. When two such housings are in the same adapter, the pitch between the plug housings matches the spacing within the adapter as defined by the SFP/QSFP standard footprint. Individual duplex connectors are inserted or extracted from such adapters.

The duplex connector currently known in the art is provided with a plug housing having two single-fiber ferrules, with the optical fibers aggregated within a single boot at the back of the connector. For two or more ports or openings in the adapter, two or more respective duplex connectors are respectively provided, each with its own uniboot. When inserted into an adapter, a part of the duplex connector latches to features inside the adapter, and the rest of the duplex connector is outside the adapter. These duplex connectors have stringent pitch and dimension requirements within the adapter, as defined by standards bodies.

U.S. Pat. No. 6,572,276 shows a grouping of four duplex connectors in which each pair of fiber optic ferrules are held together by a two-piece "core housing," which then attaches to a plug housing in the front. Additionally, the two-piece core housing then is covered by a two-piece housing shell from the top and bottom side (see, FIG. 10). The housing shell has a tapering end toward its rear side into which the optical fibers for each ferrule are introduced. The plug housing side then is inserted into an adapter. The features of the duplex connectors described in the '276 patent predate the current SFP/QSFP standards. The tapered housing shell design shown in the '276 patent requires multiple pieces to fit together and is not compatible with current adapter pitch standards. Further, the connector is incompatible with current SFP/QSFP standard adapters requiring high-density connection footprints.

Current duplex connector uniboot designs require that the individual duplex connectors are added or removed to achieve scalability. Inserting or removing these duplex connectors individually is time consuming. Certain external tools are provided to extract two or more duplex uniboot connectors together. One such tool is illustrated in US Patent Pub. No. 2019/0278028 by the Applicant. This tool is used for grouping individual duplex uniboot connectors, for example, four duplex uniboot connectors.

Thus, there is a need for an assembly and an apparatus that provides for a multi-port uniboot connector that satisfies the current standards.

SUMMARY OF THE INVENTION

The present invention is directed to a multi-port uniboot connector for multi-fiber plug housings, that includes a plurality of plug housings separated at a pitch, each plug housing accommodating at least two fibers, a common uniboot housing attached to a rear part of the plurality of plug housings, the common uniboot housing having a plurality of spring pushes integrally formed with the common uniboot housing for each of the respective plurality of plug housings, and a push-pull boot attached to a rear part of the common uniboot housing, the push-pull boot having a central opening for aggregating the at least two fibers.

In some embodiments, the connector further includes a slidable latch simultaneously coupled to one or more of the plurality of plug housings, to the common uniboot housing, and to the push-pull boot.

In some embodiments, the each of the plurality of spring pushes include projections on a side surface to respectively engage the plurality of plug housings.

In some embodiments, the plurality of plug housings and the plurality of spring pushes comprises four plug housings and four spring pushes.

In yet another aspect, there is a system for connecting a plurality of fiber optic connectors that includes an adapter having an opening on opposing sides to receive fiber optic connectors therein, a plurality of fiber optic connectors insertable into one of the opposing sides of the adapter, each of the plurality of fiber optic connectors having an outer housing and at least two fiber optic ferrules disposed within the outer housing, a portion of the outer housing making contact with the adapter, and a first multi-port uniboot connector having a plurality of plug housings separated at a pitch insertable into one of the opposing sides, each plug housing accommodating at least two fibers, a uniboot housing commonly attached to the plurality of plug housings at a rear part of the plurality of plug housings via respective spring pushes integrally formed with the uniboot housing, and a push-pull boot attached to a rear part of the uniboot housing, the push-pull boot having a central opening for aggregating the at least two fibers.

In some embodiments, the plurality of fiber optic connectors and the first multi-port uniboot connector are inserted into different sides of the adapter.

In some embodiments, the plurality of fiber optic connectors and the first multi-port uniboot connector are inserted into the same side of the adapter.

In some embodiments, the system further includes a second multi-port uniboot connector having a plurality of plug housings separated at a pitch insertable into one of the opposing sides, each plug housing accommodating at least two fibers, a uniboot housing commonly attached to the plurality of plug housings at a rear part of the plurality of plug housings via respective spring pushes integrally formed with the uniboot housing, and a push-pull boot attached to a rear part of the uniboot housing, the push-pull boot having a central opening for aggregating the at least two fibers.

In yet other embodiments, the first multi-port uniboot connector and the second multi-port uniboot connector are inserted into opposing sides of the adapter.

And in other embodiments, the first multi-port uniboot connector and the second multi-port uniboot connector are inserted into the same side of the adapter.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
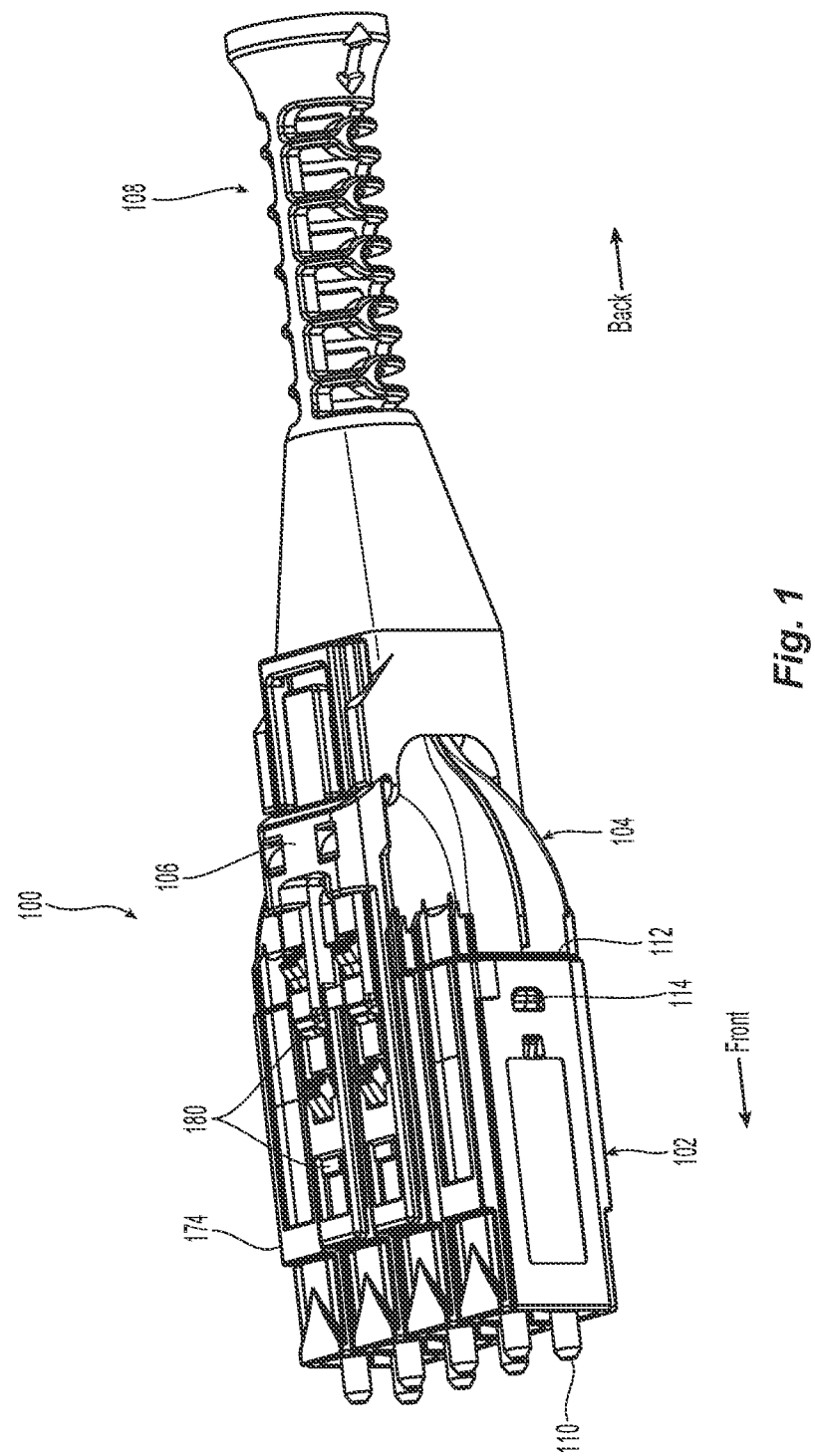
FIG. 1 is a perspective view of one embodiment of a multi-port uniboot connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector and/or the ferrule would meet with another fiber optic connector or device, while the term "rear" or "rearward" is used to mean the direction from which the optical fibers enter into the fiber-optic ferrule, the fiber optic connector, or the ferrule push. Each of the components will therefore have a front and rear, and the two fronts or forward portions of the fiber optic ferrules would engage one another. Thus, in FIG. 1, the "front" of the fiber optic assembly is on the left side of FIG. 1 and "forward" is to the left and into the page. "Rearward" or "rear" is that part of the fiber optic connector or cover that is on the right side of the page and "rearward" and "backward" is toward the right and out of the page.

Figure 2:
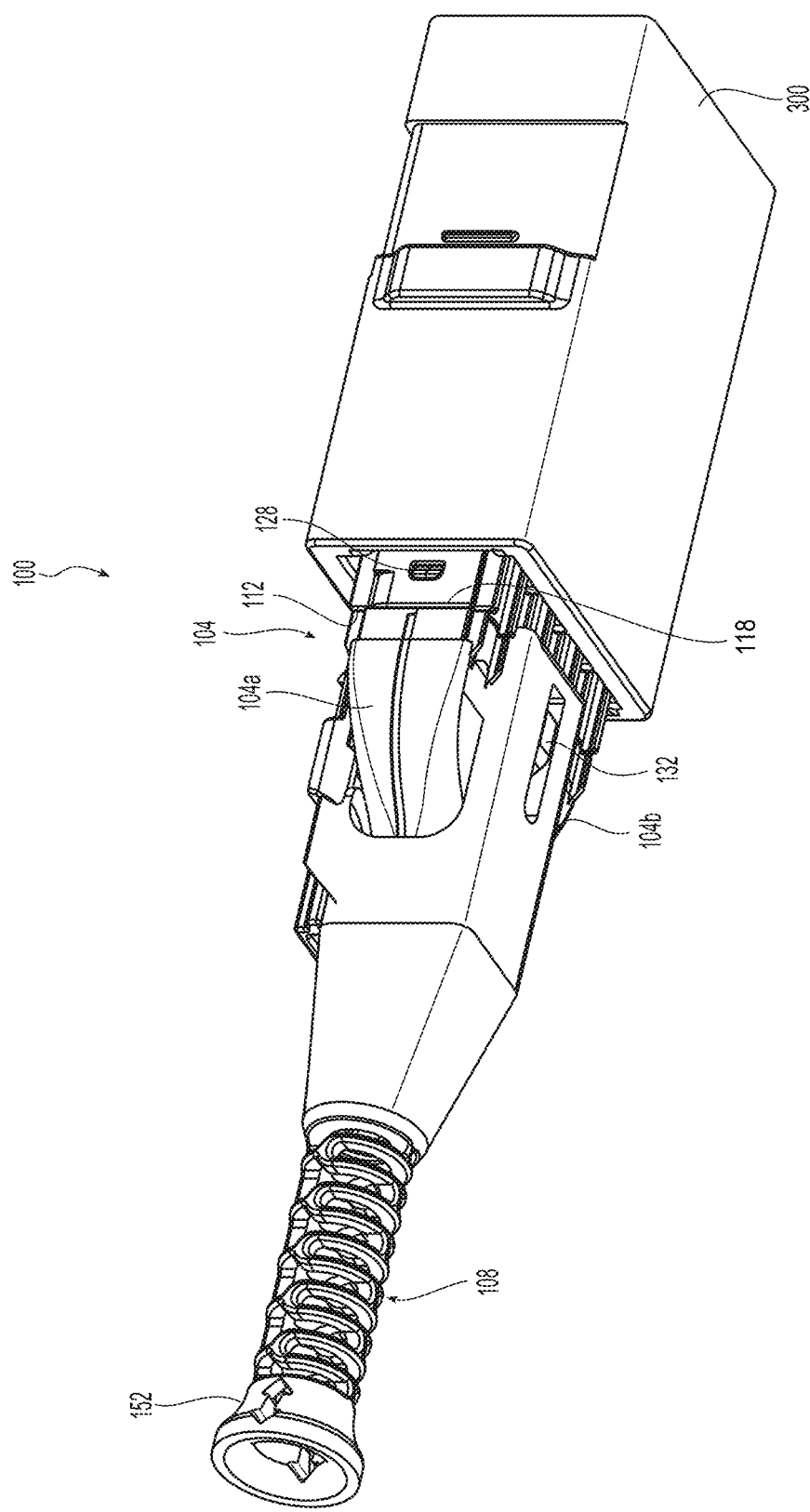
FIG. 2 is a bottom perspective view of the multi-port uniboot connector in FIG. 1 installed in an adapter.
Figure 3:
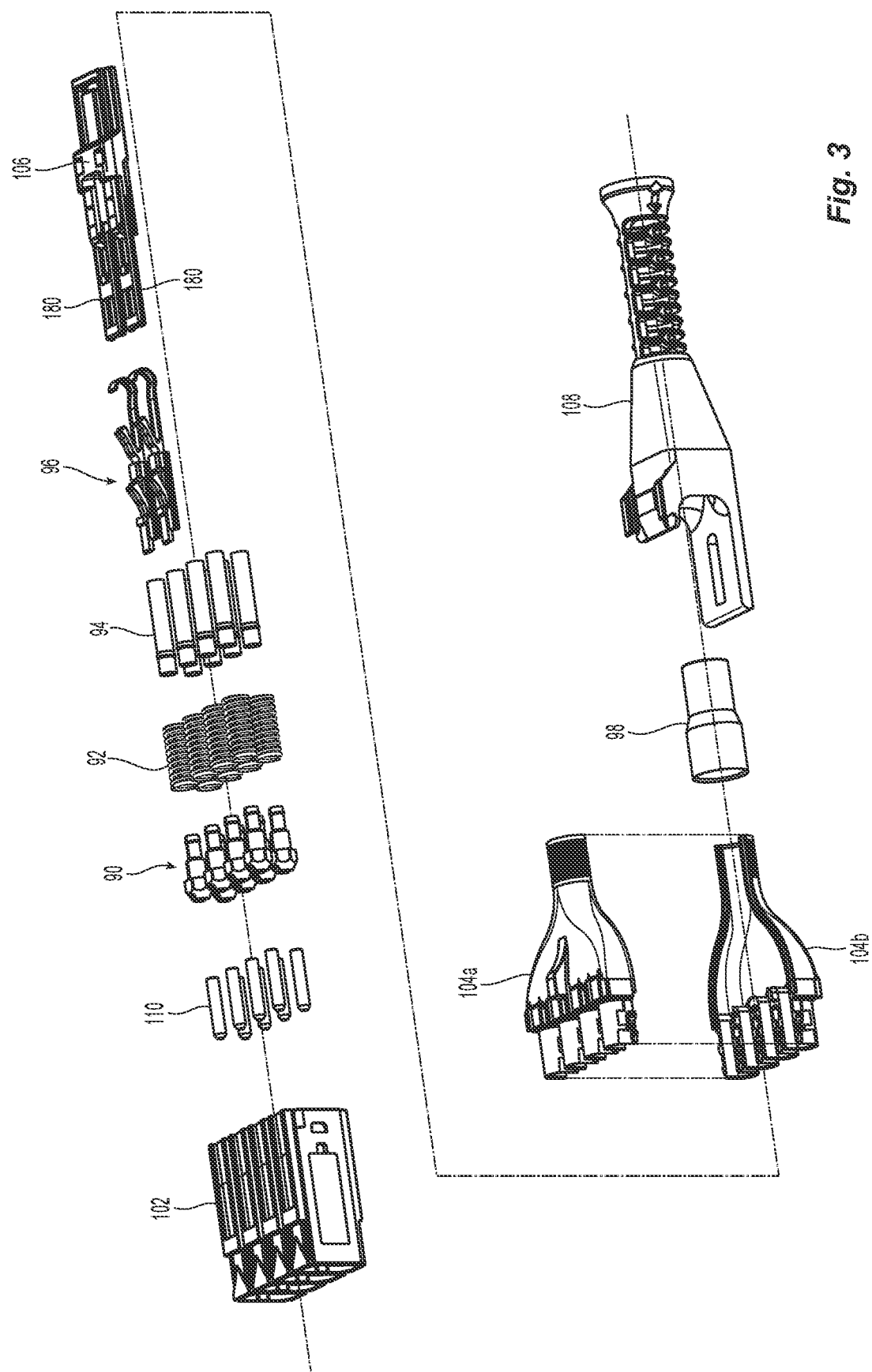
FIG. 3 is an exploded, perspective view of the multi-port uniboot connector in FIG. 1.

One embodiment of a multi-port uniboot connector for multi-fiber plug housings 100 is illustrated in FIGS. 1-6 ("the uniboot connector"). The uniboot connector 100 has, moving from left to right in FIG. 1, a plurality of plug housings 102, a common uniboot housing 104, a slidable latch 106 that may be used to secure the uniboot connector 100 in an adapter 300 (see, e.g., FIG. 4), and a push-pull boot 108 that is attached to the common uniboot housing 104 and the slideable latch 106 and allows the user to insert and remove the uniboot connector 100 from the adapter 300. As will be recognized, there are multiple sets or ports of optical fibers but there is a single boot for all of the sets or ports—thus, the multi-port and uniboot descriptors for the innovative connector. There are other parts of the connectors that may be necessary for the functioning of the connector that are known. As illustrated in FIG. 3, for example, the uniboot connector may also have ferrule holders 90, springs 92, lead-in tubes 94, a latch body 96, and a crimp band 98.

Similarly, the plurality of plug housings 102 are preferably multi-fiber in that they each contain at least two optical fibers. The optical fibers may be in two different fiber optic ferrules or there may be multiple optical fibers in a single fiber optic ferrule. The only requirement is that the form factor used for the ports or the fiber optic ferrules needs to be able to mate with other connectors in the adapter 300 in FIG. 4. The adapter is a standard adapter (standard SFP/QSFP footprint) and accepts the plurality of plug housings 102 as if they were separate entities. Therefore, and as illustrated below, there can be a uniboot connector 100 on one side of the adapter and multiple single connectors on the other side. See, e.g. WIPO Pub. No. WO 2019/126333 assigned to the same applicant.

Referring back to FIGS. 1-6, the uniboot connector 100 has four plug housings 102, although there could be more (8+) or fewer (2). The plurality of plug housings 102 have the same configuration and dimensions as a conventional MDC-type connector housing as noted in the WIPO publication mentioned above. Thus, the plurality of plug housings 102 are separated at a pitch for the standard adapter. See FIG. 5. Each of the plurality of plug housings 102 has two optical fibers secured therein, preferably in a fiber optic ferrule 110. See FIG. 6. Each of the plurality of plug housings 102 are then attached at a back end 112 to the common uniboot housing 104. See, e.g., FIGS. 1 and 2. The plurality of plug housings 102 have at least one detent window 114 on each side to receive detents on spring pushes integrally formed in or integrally molded with the common uniboot housing 104. As can be seen in FIGS. 1 and 2, there are two such detent windows 114 on each side, as discussed in detail below. Each of the plurality of plug housings 102 has a rear surface 118 at the back end 112 that engages the common uniboot housing 104 and therefore limits the how far back the plurality of plug housings 102 can be installed on the common uniboot housing 104.

Turning now to the common uniboot housing 104, it is best illustrated in FIGS. 7-11. The common uniboot housing 104 is preferably a two piece item, with a top portion 104a and a bottom portion 104b. The two pieces 104a and 104b are connected to one another by a friction fit and are further held together by the push-pull boot 108 and the plurality of plug housings 102 when they are connected, as explained in more detail below. Alternatively, the top portion 104a and a bottom portion 104b could be connected in other ways as well. For example, they could attached with an adhesive, ultrasonically welded, etc. The separate pieces of the common uniboot housing 104 allows for the arrangement of the plurality of plug housings 102 and their optical fibers within the bottom portion 104b.

The common uniboot housing 104 has a front end 120, a back end 122 and a transition area 124. At the front end 120 are integral spring pushes 126. The integral spring pushes 126 are preferably formed at the same time as the common uniboot housing 104. In reality, since there are two pieces that make up the common uniboot housing 104, only half of the integral spring pushes 126 are present on each portion 104a and 104b of the common uniboot housing 104. Each of the integral spring pushes 126 also have detents 128 on the sides thereof to engage the detent windows 114 on the plurality of plug housings 102 as noted above. See, e.g., FIGS. 6-8. There is some play allowed between the detent windows 114 and the detents 128 so that the structures inside the adapter 300 control the location of the plurality of plug housings 102 and the fiber optic ferrules 110 relative thereto. However, at least one of the detents 128 has a rearward facing surface 128a that is disposed within and designed to engage the detent windows 114 to prevent the plurality of plug housings 102 from coming loose when the uniboot connector 100 is removed from the adapter 300. See FIG. 8. The detents 128 and the detent windows 114 could be diposed on the other elements, i.e., the detents 128 could be on the plurality of plug housings 102 and the detent windows 114 on the integral spring pushes 126.

The common uniboot housing 104 also has a rear surface 116 that surrounds each of the integral spring pushes 126 to limit the rearward travel of the plurality of plug housings 102. See, e.g., FIG. 9.

The transition area 124 provides for a gradual narrowing of the common uniboot housing 104 to prevent adverse handling of the optical fibers. At the back end 122 of the common uniboot housing 104 is a rounded exit for the optical fibers. On the outside there is a threaded area 130 for a crimp band 98 (see FIG. 3) to secure the strength members of optical cables. See, e.g., FIG. 8.

On each of the top portion 104a and a bottom portion 104b are slide posts 132 that engage with the push-pull boot 108. As explained with regard to the push-pull boot 108, the slide posts 132 have a forward facing surface 134 that engages a portion of the push-pull boot 108 to assist in removing the uniboot connector 100 from the adapter 300.

Figure 12:
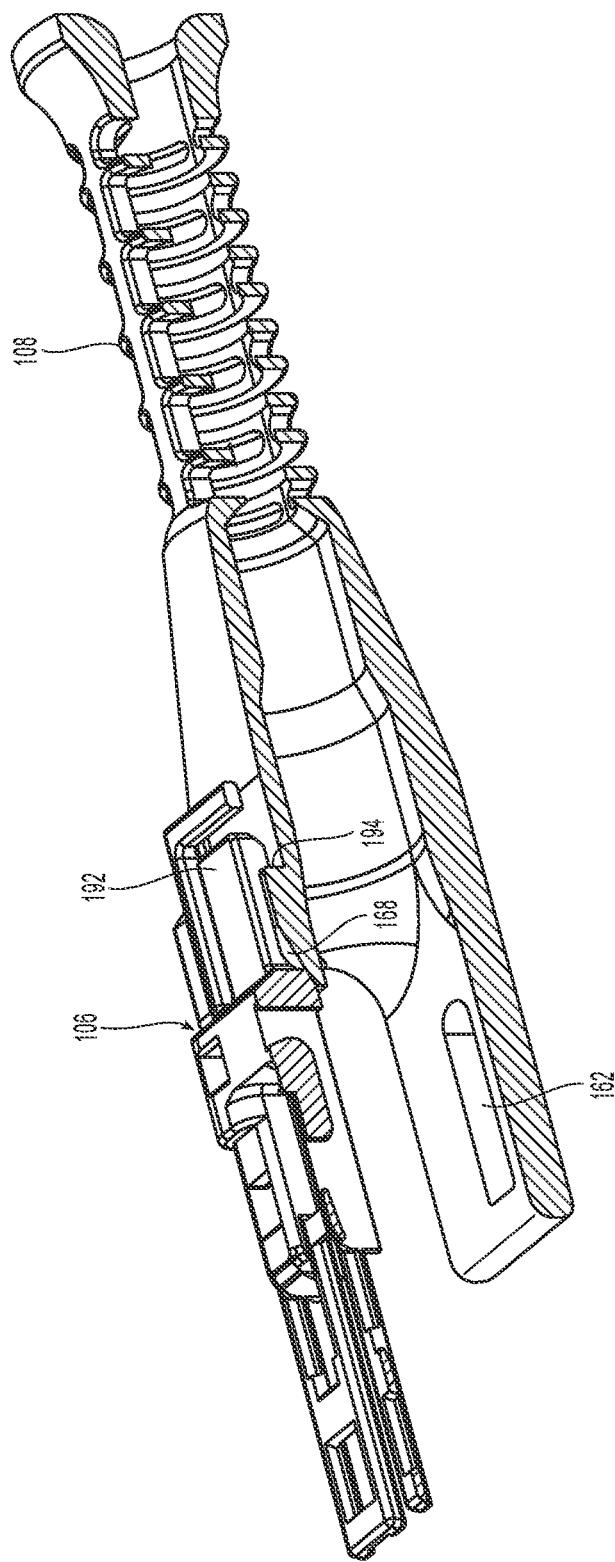
FIG. 12 is a cross section view of the push-pull boot and a latch for the multi-port uniboot connector in FIG. 10.
Figure 13:
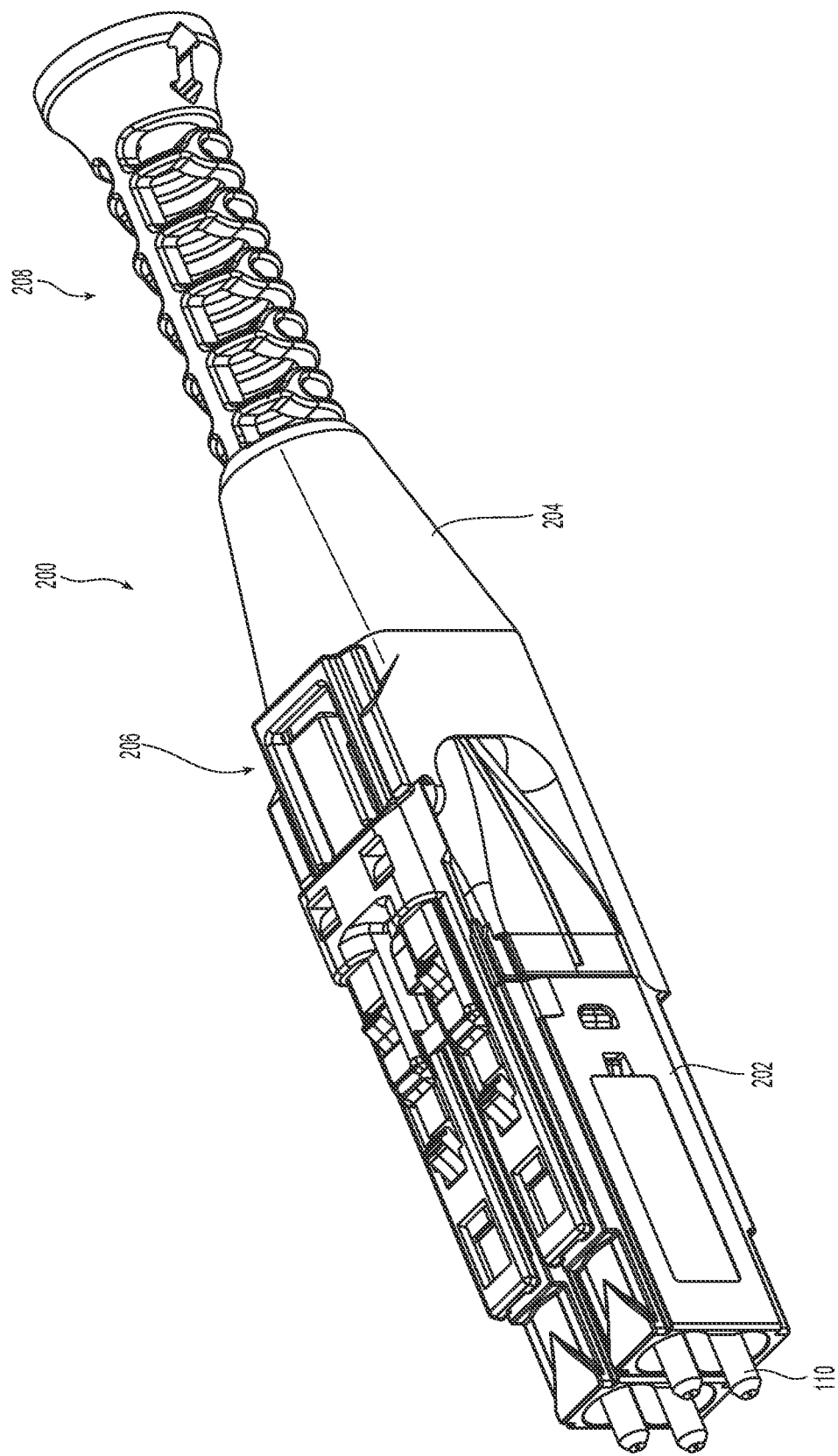
FIG. 13 is a perspective view of a two port version of a uniboot connector with two plug housings according to the present invention.
Figure 14:
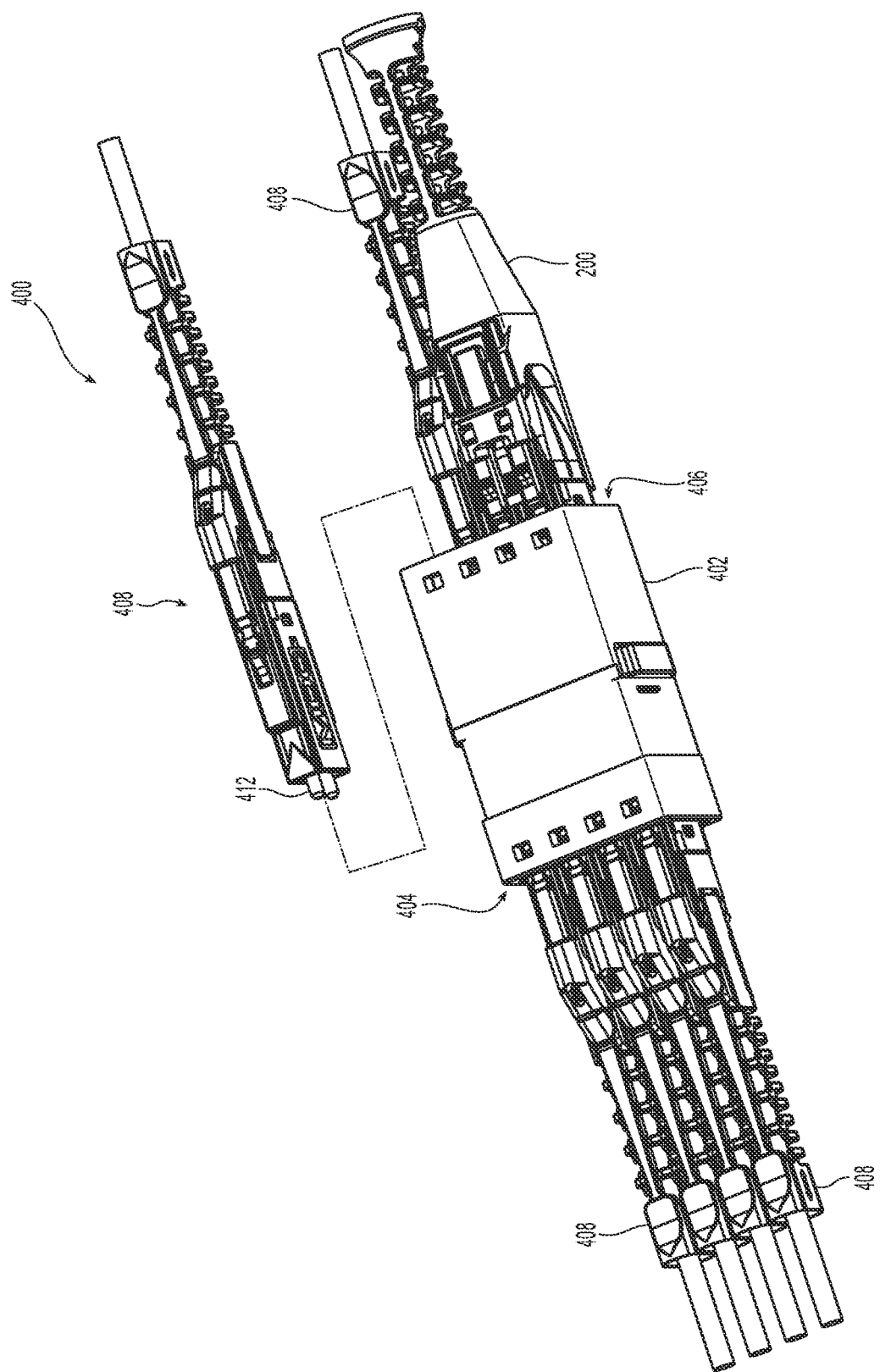
FIG. 14 is a perspective of one embodiment of a system for connecting a plurality of fiber optic connectors according to the present invention.

Turning to the push-pull boot 108, it is best seen in FIGS. 12-14. The push-pull boot 108 allows for easy insertion and removal of the uniboot connector 100 from the adapter 300. The push-pull boot 108 has front portion 140, a middle portion 142, and a rear portion 144. The rear portion has spine 146 and a plurality of ribs 148. The spine 146 extends from the rear end 150 to the middle portion 142 and is parallel to a longitudinal axis A through the length of the push-pull boot 108. The plurality of ribs 148 generally extend around the rear portion 144. This configuration allows for the push-pull boot 108 to flex in all directions except along the longitudinal axis A, along which the push-pull boot 108 exhibits a stiffness or a resistance to flex or deform. The rear portion 144 also includes a grasping portion 152. The spine 146, the ribs 148, and the grasping portion 153 combine to form a portion of a central opening 154, which extends to a front portion 156 of the middle portion 142. The optical fibers and/or the fiber cable is threaded through the central opening 154 for protection from damage during use.

Figure 4:
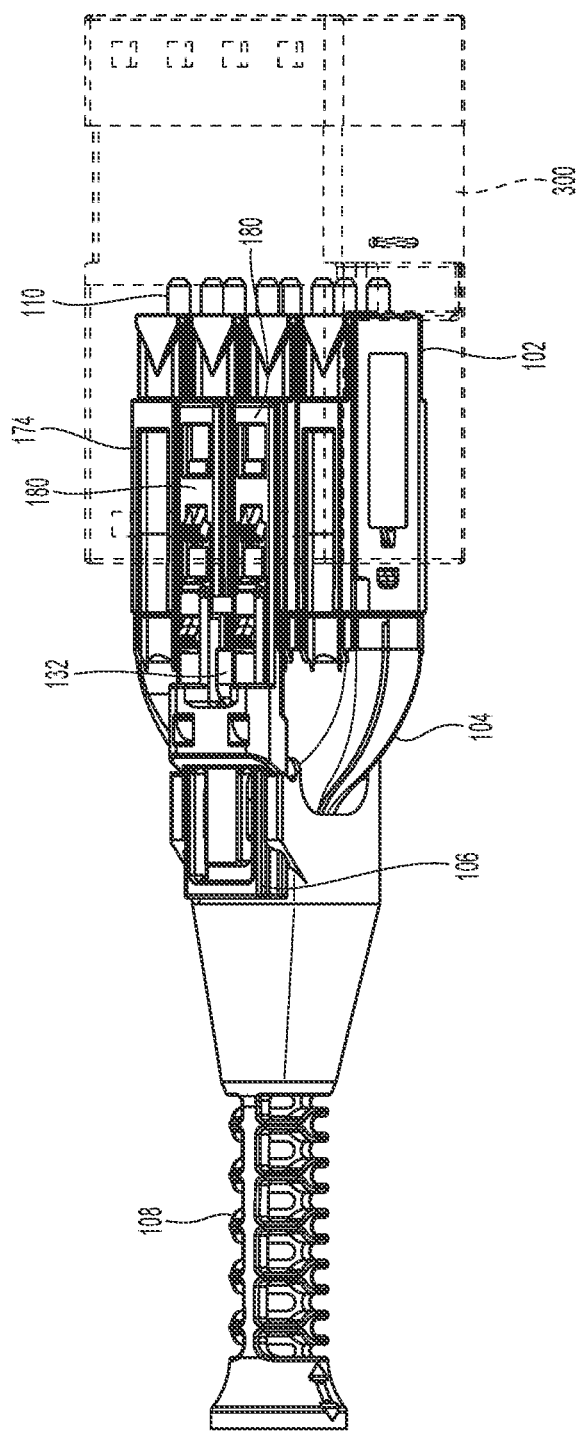
FIG. 4 is a top perspective view of the multi-port uniboot connector in FIG. 1 inserted into an adapter in dotted line.
Figure 5:
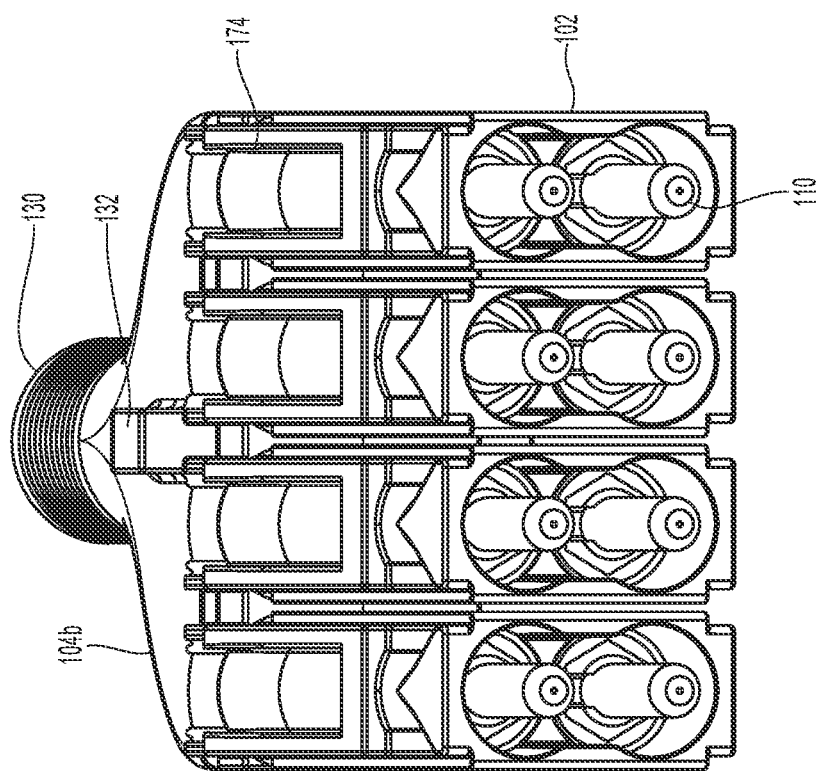
FIG. 5 is a front perspective view of the bottom of the multi-port uniboot connector in FIG. 1.
Figure 6:
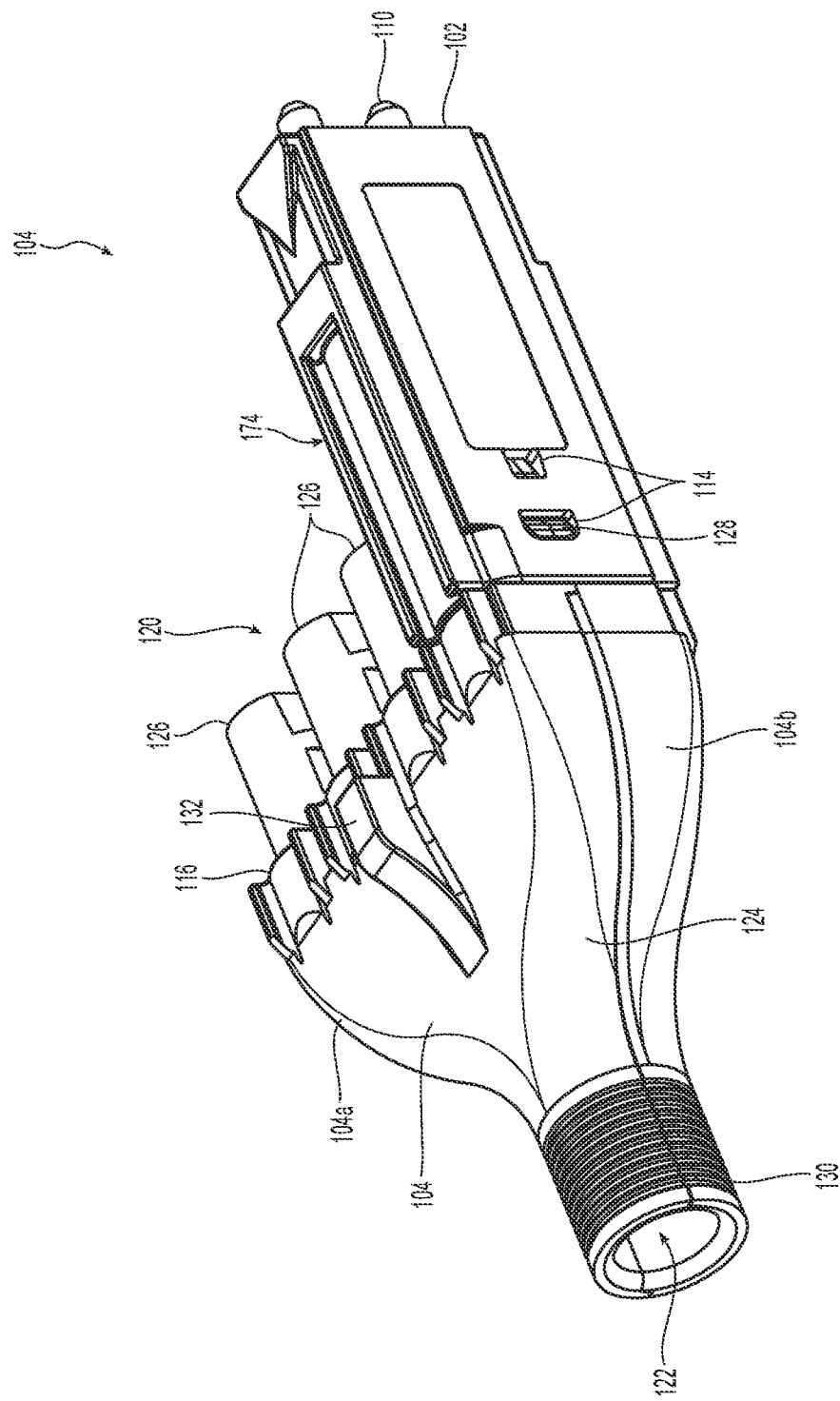
FIG. 6 is a perspective view of the uniboot housing with one plug housing.
Figure 7:
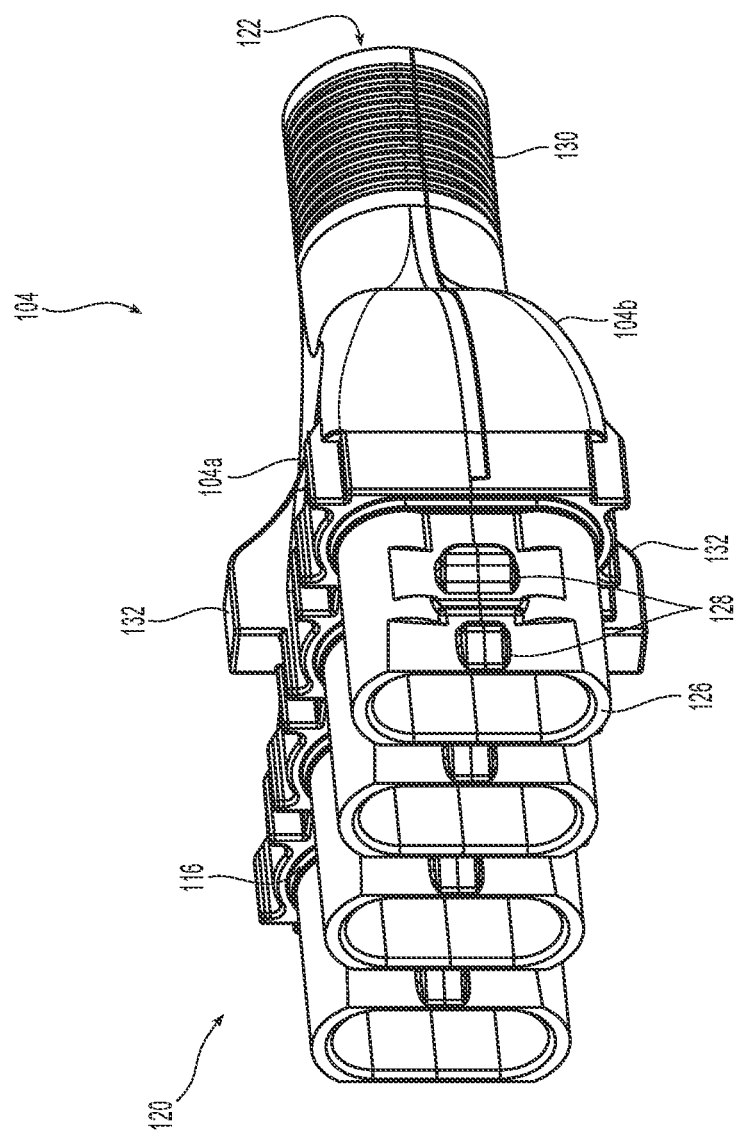
FIG. 7 is an elevational view of the uniboot housing in FIG. 6.
Figure 8:
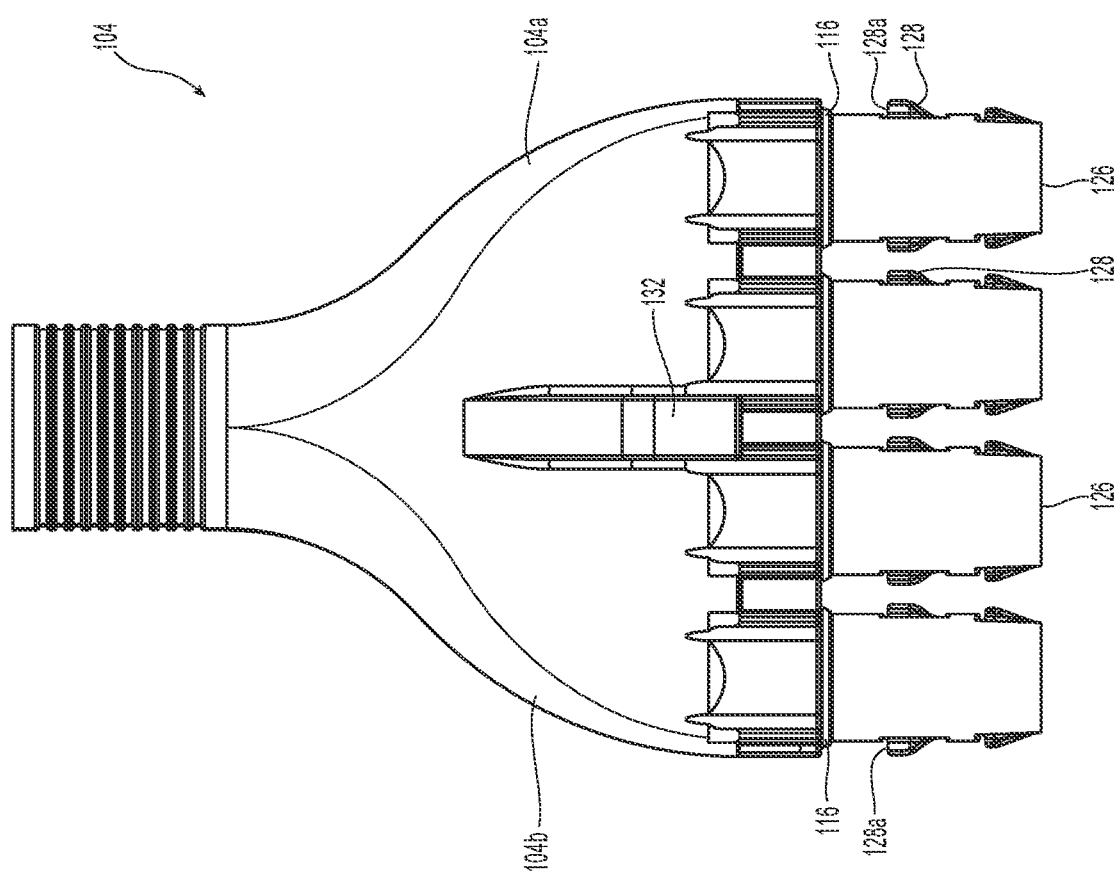
FIG. 8 is a top view of the uniboot housing in FIG. 6.
Figure 9:
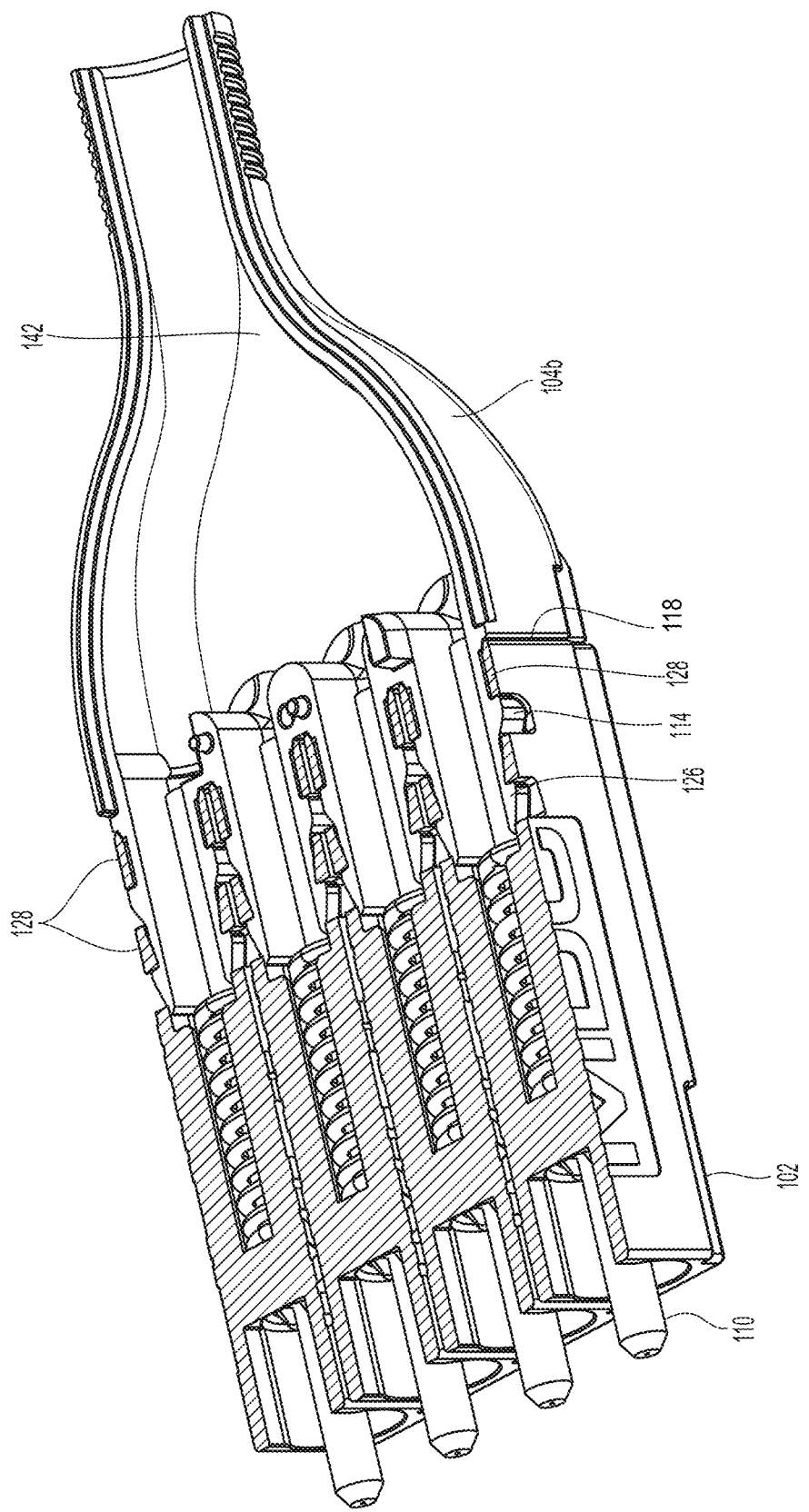
FIG. 9 is a cross section view of the uniboot connector in FIG. 6.
Figure 10:
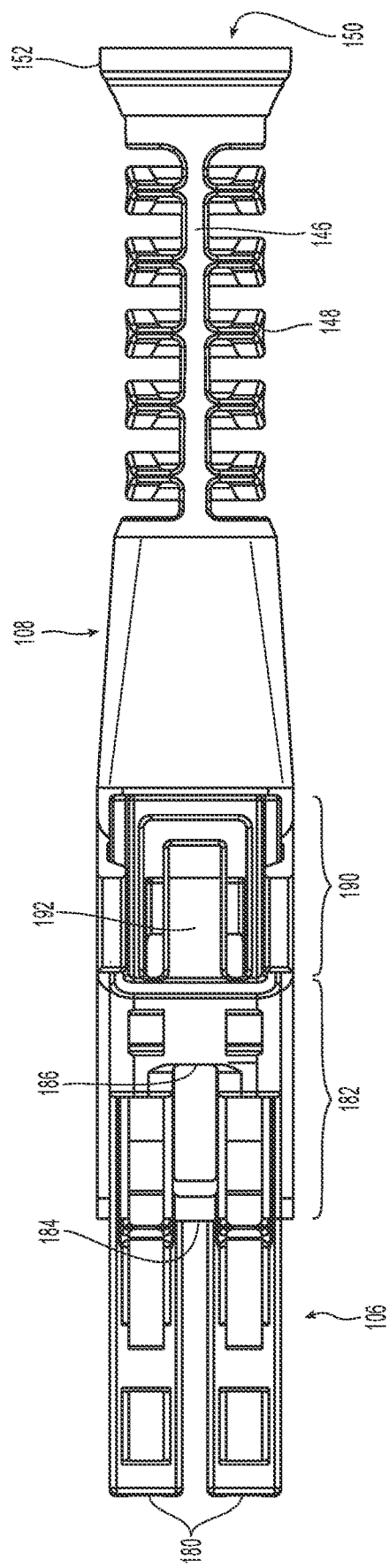
FIG. 10 is a top view of the push-pull boot and a latch for the multi-port uniboot connector in FIG. 1.
Figure 11:
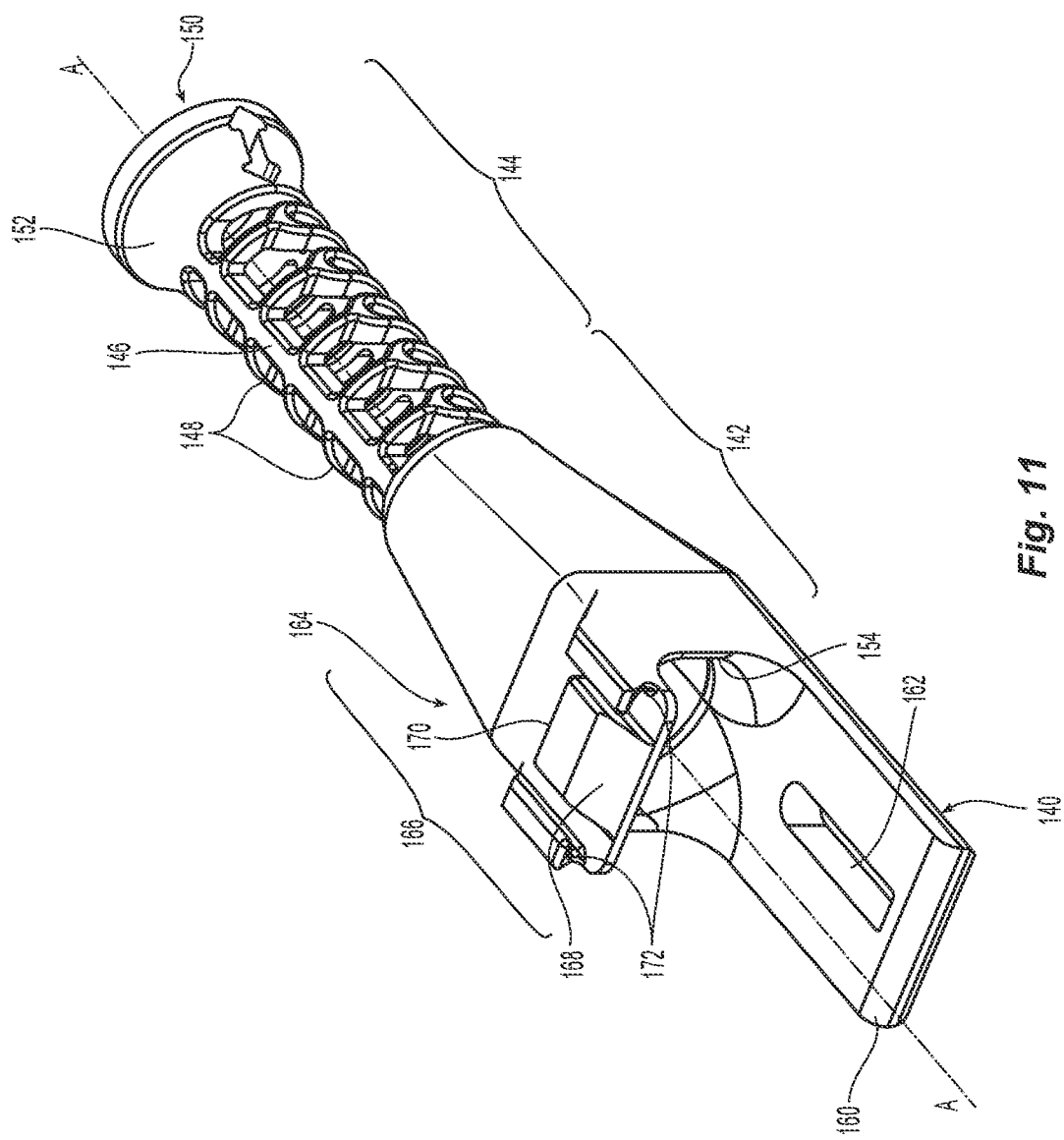
FIG. 11 is a perspective view of the push-pull boot in FIG. 10.

The front portion 140 has a tongue 160 with a slot 162 to receive the slide post 132 from the bottom portion 104b of the common uniboot housing 104. On the top 164 of the middle portion 142 is a latch section 166 with a latch ramp 168 and a latch stop surface 170. The push-pull boot 108 also has rails 172 on the top 164 to engage the slideable latch 106. It should also be noted that the plurality of plug housings 102 also have rails 174 that engage the slideable latch 106. See FIG. 1. One of ordinary skill in the art in view of this disclosure would have noticed that the slideable latch 106 only engages the rails 174 in two of the plurality of plug housings 102, as depicted in FIGS. 1 and 4, rather than all four of them. It is also clear that with the four plug housings 102, the two center plug housings 102 are connected to the slideable latch 106. It would also be possible for the slideable latch 106 to engage the two outside plug housings 102 instead. In any event, it is more convenient that all of the plug housings 102 have the rails 174 so that there no need to worry about having the correct one to which the slideable latch 106 attaches.

The slideable latch 106 has two front extensions 180 that extend forwardly from a middle portion 182. A crossbar 184 in the middle portion 182 joins the two front extensions 180 such that the front extensions 180, the crossbar 184 and the a forward facing element 186 of the middle portion 182 between the front extensions 180 but behind the crossbar 184 forms a post window 188 for the slide post 132 on the top portion 104a.

The slideable latch 106 is inserted from the rear over the latch ramp 168 and between the rails 172. See, FIG. 12. The rear portion 190 of the slideable latch 106 includes a cantilevered portion 192 that slides on the latch ramp 168 as the slideable latch 106 is slid into the rails 172. The cantilevered portion 192 extends rearwardly from the middle portion 182. The cantilevered portion 192, which has a forward facing surface 194 (see FIG. 14) then engages the a latch stop surface 170 securing the slideable latch 106 to the push-pull boot 108. When the push-pull boot 108 is pulled on to remove the uniboot connector 100, the push-pull boot 108 pulls on the slideable latch 106 disengaging the latches in the front extensions 180 from the adapter 300. As the push-pull boot 108 is continued to be pulled, the slide posts 132, and the forward facing surface 134 in particular, engages the windows 162 and 188 causing the common uniboot housing 104 to be pulled backward and out of the adapter.

As noted above, the uniboot connector 100 may have more or fewer than the four ports illustrated above. Illustrated in FIG. 13 is a dual-port uniboot connector 200. The uniboot connector 200 has the same general components, except that the common uniboot housing 104 has only room for two integral spring pushes (not visible). Otherwise, the components are the same: plug housings 202, a common uniboot housing 204, a slidable latch 206, and a push-pull boot 208. The latch 206 may be the very same latch as discussed above since both latches slideable latch 106,206 connect with two of the plug housings.

Finally, turning to FIG. 14, there is illustrated there one embodiment of a system 400 for connecting a plurality of fiber optic connectors. The system 400 includes an adapter 402 (or other receptacle that allows for the mating of fiber optic connectors) that has a first side 404 and a second side 406. A plurality of individual fiber optic connectors 408 are inserted into the adapter 402 on the first side 404. There are also two individual fiber optic connectors 408 that are inserted on the second side 406. Also on the second side is the dual-port uniboot connector 200. Thus, on the second side 406 there are both individual fiber optic connectors 408 as well as a multi-port uniboot connector 200. It is also possible that the uniboot connector 100 could be inserted on either the first side 404 or the second side 406 and mate to individual connectors 408, two of the multi-port uniboot connectors 200, a combination thereof, or another uniboot connector uniboot connector 100.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A multi-port uniboot connector for multi-fiber plug housings, comprising:
   a plurality of plug housings separated at a pitch, each plug housing accommodating at least two fibers;
   a common uniboot housing attached to a rear part of the plurality of plug housings, the common uniboot housing having a plurality of spring pushes integrally formed with the common uniboot housing, one of the plurality of spring pushes for each of the respective plurality of plug housings;
   a push-pull boot attached to a rear part of the common uniboot housing, the push-pull boot having a central opening for aggregating the at least two fibers, and
   a slidable latch simultaneously coupled to one or more of the plurality of plug housings, to the common uniboot housing, and to the push-pull boot.

2. The multi-port uniboot connector according to claim 1, wherein each of the plurality of plug housings further accommodates at least one fiber optic ferrule.

3. The multi-port uniboot connector according to claim 1, wherein each of the plurality of spring pushes include projections on a side surface to respectively engage the plurality of plug housings.

4. The multi-port uniboot connector according to claim 1, wherein the common uniboot housing has a rear stop surface for the plurality of plug housings.

5. The multi-port uniboot connector according to claim 1, wherein the plurality of plug housings and the plurality of spring pushes comprises four plug housings and four spring pushes.

6. The multi-port uniboot connector according to claim 1, wherein the plurality of plug housings and the plurality of spring pushes comprises two plug housings and two spring pushes.

7. A system for connecting a plurality of fiber optic connectors comprising:
   an adapter having an opening on opposing sides to receive fiber optic connectors therein;
   a plurality of fiber optic connectors insertable into one of the opposing sides of the adapter, each of the plurality of fiber optic connectors having an outer housing and at least two fiber optic ferrules disposed within the outer housing, a portion of the outer housing making contact with the adapter
   a first multi-port uniboot connector having a plurality of plug housings separated at a pitch insertable into one of the opposing sides, each plug housing accommodating at least two fibers, a uniboot housing commonly attached to the plurality of plug housings at a rear part of the plurality of plug housings via respective spring pushes integrally formed with the uniboot housing, and a push-pull boot attached to a rear part of the uniboot housing, the push-pull boot having a central opening for aggregating the at least two fibers, and
   a slidable latch simultaneously coupled to one or more of the plurality of plug housings, to the common uniboot housing, and to the push-pull boot.

8. The system for connecting a plurality of fiber optic connectors according to claim 7, wherein the plurality of fiber optic connectors and the first multi-port uniboot connector are inserted into different sides of the adapter.

9. The system for connecting a plurality of fiber optic connectors according to claim 7, wherein the plurality of fiber optic connectors and the first multi-port uniboot connector are inserted into the same side of the adapter.

10. The system for connecting a plurality of fiber optic connectors according to claim 7, further comprising a second multi-port uniboot connector having a plurality of plug housings separated at a pitch insertable into one of the opposing sides, each plug housing accommodating at least two fibers, a uniboot housing commonly attached to the plurality of plug housings at a rear part of the plurality of plug housings via respective spring pushes integrally formed with the uniboot housing, and a push-pull boot attached to a rear part of the uniboot housing, the push-pull boot having a central opening for aggregating the at least two fibers.

11. The system for connecting a plurality of fiber optic connectors according to claim 10, wherein the first multi-port uniboot connector and the second multi-port uniboot connector are inserted into opposing sides of the adapter.

12. The system for connecting a plurality of fiber optic connectors according to claim 10, wherein the first multi-port uniboot connector and the second multi-port uniboot connector are inserted into the same side of the adapter.

* * * * *